(12) United States Patent
Rawe

(10) Patent No.: US 6,484,416 B1
(45) Date of Patent: Nov. 26, 2002

(54) APPARATUS FOR PRODUCING CEMENT CLINKER

(75) Inventor: Klaus Rawe, Cologne (DE)

(73) Assignee: KHD Humboldt Wedag AG, Cologne (DE)

( * ) Notice: Subject to any disclaimer, the term of this patent is extended or adjusted under 35 U.S.C. 154(b) by 0 days.

(21) Appl. No.: 09/604,444

(22) Filed: Jun. 27, 2000

(30) Foreign Application Priority Data

Jun. 25, 1999 (DE) .......................... 199 29 066

(51) Int. Cl.⁷ .......................... F26B 19/00; F26B 25/06
(52) U.S. Cl. .......................... 34/209; 34/210; 34/212; 432/106
(58) Field of Search .......................... 34/209, 210, 212, 34/213, 214; 432/106

(56) References Cited

U.S. PATENT DOCUMENTS

| | | | | |
|---|---|---|---|---|
| 3,716,387 A | * | 2/1973 | Simmons et al. ........... 106/100 |
| 3,765,919 A | * | 10/1973 | Gelbman ................ 106/288 B |
| 4,233,036 A | * | 11/1980 | Koch et al. .................... 201/9 |
| 4,299,560 A | * | 11/1981 | Nakamura et al. .......... 432/106 |
| 4,325,311 A | * | 4/1982 | Beranek et al. ............. 110/245 |
| 5,271,162 A | * | 12/1993 | Kunz et al. ................... 34/493 |
| 5,505,389 A | * | 4/1996 | Sussegger et al. ............ 241/48 |

* cited by examiner

Primary Examiner—Jiping Lu
(74) Attorney, Agent, or Firm—Sonnenschein Nath & Rosenthal

(57) ABSTRACT

It is required with respect to the production of cement clinker from wet slurry raw materials that are calcined to cement clinker in a drying-rotary pipe furnace, which is preceded by a cyclone suspension type heat exchanger system, after the materials have been processed—to initially mechanically dewater the raw meal slurry up to a moisture of approximately 20% and to subsequently thermally dry the materials up to a residual moisture of approximately 0.5 through 1.0%. It is inventively proposed to carry out this thermal drying in a static cascade-step drier, whereby hot gas from the cyclone heat exchangers, in cross current, is led through the step drier for the drying.

19 Claims, 2 Drawing Sheets

APPARATUS FOR PRODUCING CEMENT CLINKER

BACKGROUND OF THE INVENTION

The invention relates to an apparatus for producing cement clinker from wet slurry raw materials that are mechanically dewatered, dried, heated in a cyclone suspension type heat exchanger system, calcined in a calcining step, calcined to cement clinker in a rotary furnace and cooled in a clinker cooler.

A known method of the cement clinker manufacture, the wet method, is characterized in that the utilized wet raw materials are milled together in wet-process rotary tubular mills in order to thus receive a fine grained and intimately mixed raw slurry. Then, this raw slurry is directly calcined to clinker in a wet-process tubular furnace, potentially with chain inserts, or is formed to pellets after a preliminary desiccation, which pellets are subsequently calcined in the rotary tubular furnace.

In the course of time, the drying method, which is thermally more beneficial, has succeeded, whereby raw materials that are milled in a dry fashion are calcined to cement clinker in a rotary tubular furnace with a preceding cyclone suspension type heat exchanger system.

Given the conversion of present wet apparatuses into modern drying apparatuses, it is known to maintain the wet-processing of the raw material and to convert the slurry raw material (raw meal slurry), by means of a mechanical and subsequent thermal dewatering, into a dryness required for feeding the cyclone heat exchanger.

For example, it is known to bring the raw slurry from the wet-grinding mills from its pumpable moisture up to a moisture of approximately 20% via a mechanical dewatering in the form of filter presses, drum filters etc. Then, the received filter cake is thermally dried, with respect to the required residual moisture of preferably 0.5 through 1.0%, in a flight stream drier, for example, which comprises an impact hammer breaker, a rising tube and a separator. Further, it is known to carry out the thermal drying in a drum type drier or in flash driers with throwshovels or in impact driers.

The industrial outlay required for the drying of the filter cake by means of utilizing rotating machine parts is disadvantageous with respect to the cited drying apparatuses, which are actually designed for the mill drying. For example, the impact hammer breaker of the flight stream drier must be dimensioned regarding its power draw such that the hammers are pulled through the material, which is still moist, at the impact hammer breaker bottom even when the drying power is not sufficient.

EP-B-0 650 763 discloses a circulation crushing plant with a high-pressure roller press for the interparticle comminution of the material to be fed and with a static cascade separator that works according to the principle of a cross current separator, which can be operated by means of air and also by means of hot gas when the feed to be crushed is moist, so that the crushing plant is then utilized for the mill drying. It is not known to utilize such a circulation crushing plant or parts thereof with respect to the what is referred to as wetprocess for purposes of manufacturing cement clinker from wet slurry raw materials.

SUMMARY OF THE INVENTION

The invention is based on the object of fashioning the thermal drying of the filter cake in terms of the apparatus such that the drying is adapted to the specific properties of the fine grained filter cake and to the objective of the drying of the manufacture of a raw meal that is appropriate for feeding the cyclone suspension type heat exchanger system, whereby the construction and cost outlay is low given the manufacture of cement clinker from wet slurry raw materials.

As a result of the invention—which dries the fine grained filter cakes that arise during the mechanical preliminary dessication in a static step drier, which is pressurized with hot gas of approximately 340° C. through 550° C. from the cyclone suspension type heat exchanger system of the rotary tubular furnace, up to a residual moisture of 0.5 through 1.0.%—a raw meal, which is suitable for feeding the cyclone heat exchanger, is produced with simple means concerning the construction and with low operating expenses.

The step drier is equipped with two separating and drying zone limiting walls, which are surrounded by the shaft-shaped housing and which form a separating zone and drying zone between them and which are traversed by hot gas in a cross current, which separating and drying zone limiting walls have baffles that are transversely downwardly slanted in the direction of the discharge opening for separated coarse material that is possibly still moist and that are arranged in a cascade-like manner which could include being slatted, whereby the two baffle walls and therefore the separating and drying zone lying therebetween are obliquely arranged with an angle deviating from the vertical line.

The hot gas that is required for the drying is tapped, with temperatures of approximately 340° C. through 550° C., at a suitable location from the cyclone heat exchangers of the rotary tubular furnace; this is the reason why the step drier is also designed for these temperatures. The hot gas is laterally introduced into the step drier via a corresponding opening; it initially passes the separating and drying zone of the step drier in the cross current and then leaves the step drier on the other side of the drying zone, for example via an upper opening, and is now loaded with dried raw meal.

The drying in the step drier ensues as follows. The filter cake from the mechanical dewatering, particularly filter press, is supplied via a filter cake conveying device to the admission opening, which is arranged in the upper part of the step drier and which is provided with a mechanical milling device, such as a hasp and is coarsely crushed there. Then, the filter cake pieces arrive at the separating and drying zone of the step drier and come in contact with the hot gas. Due to the suddenly arising vaporization, the filter cake pieces are spread out in all directions and are therefore crushed further. The crushed material, with gravitational force, falls downward via the steps of the step drier, which steps are fashioned in the shape of cascades, and is thereby dried further by means of the hot gas. The thereby received dried fine material-raw meal with a residual moisture of, for example, 0.5 through 1.0% is laterally or, respectively, upwardly outlet in the step drier together with the hot gas and the formed vapors, and is then transported out of the step drier at the upper end of it. In a cyclone pre-separator that follows the step drier, the dried fine material is separated from the hot gas and the formed vapors; the fine material is fed into the cyclone suspension type heat exchanger system via a raw meal conveying device, while the separated gas (hot gas and vapors) is supplied for a dedusting via a fan.

The more coarse raw material portions that are still present after the drying process and that potentially have not yet dried up to the required residual moisture are downwardly transported in the step drier by means of gravitational force and are discharged through a discharge opening. For purposes of keeping an optimally low pressure loss in the step drier, the discharge opening is provided with a lock (such as an air lock), with a double rotary lock, for example. Subsequently, the step drier is fed via conveying devices (for example conveyor belts, bucket chain conveyor) with the coarse material, which is still moist and which is separated from the other material stream, together with fresh material.

BRIEF DESCRIPTION OF THE DRAWINGS

Further details, advantages and features of the invention are subsequently explained in greater detail on the basis of an exemplary embodiment shown in a schematic drawing.

DETAILED DESCRIPTION OF THE PREFERRED EMBODIMENTS

Figure 1:
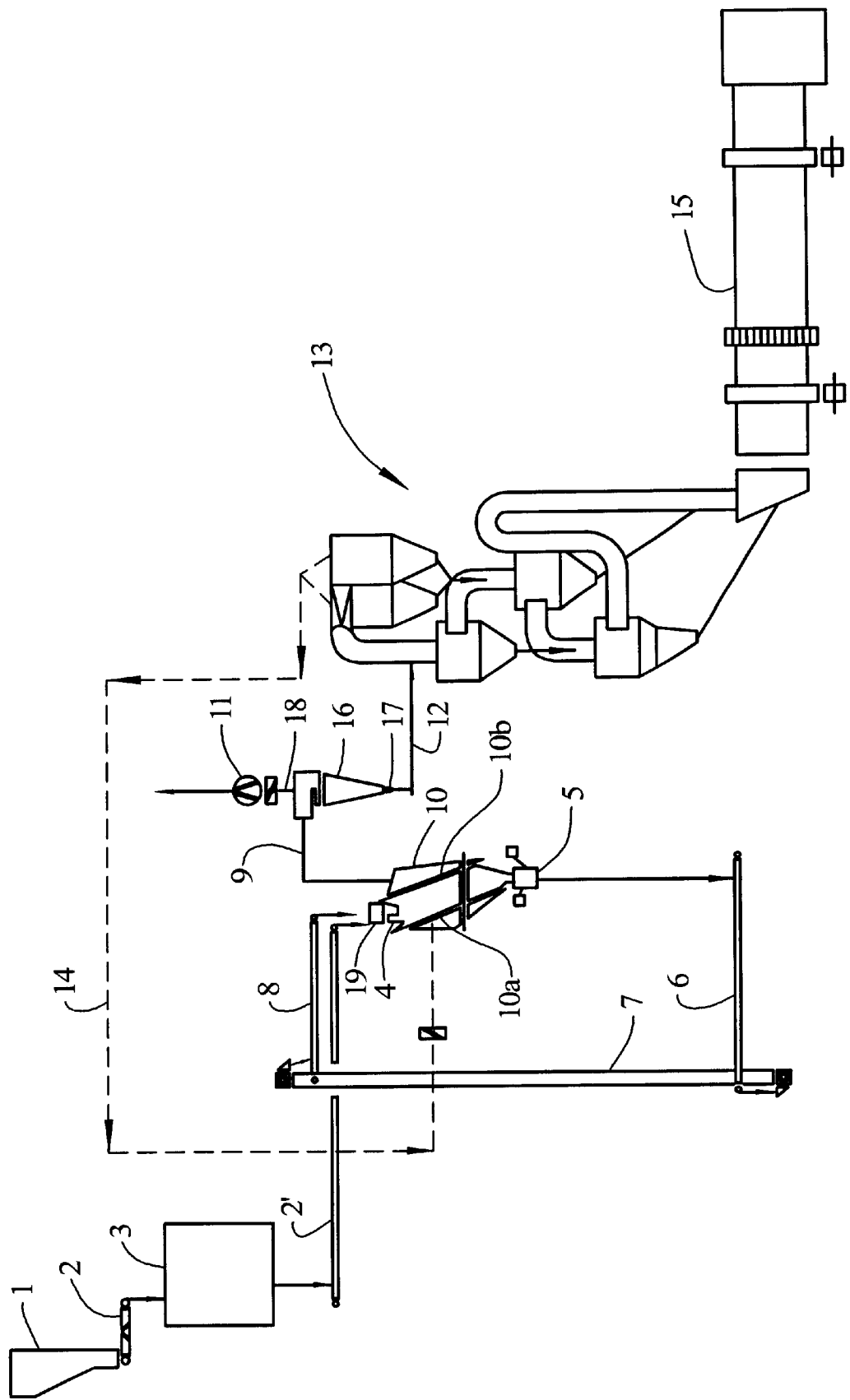
FIG. 1 is a flowchart showing an inventive apparatus for producing cement clinker upon employment of a step drier.
Figure 2:
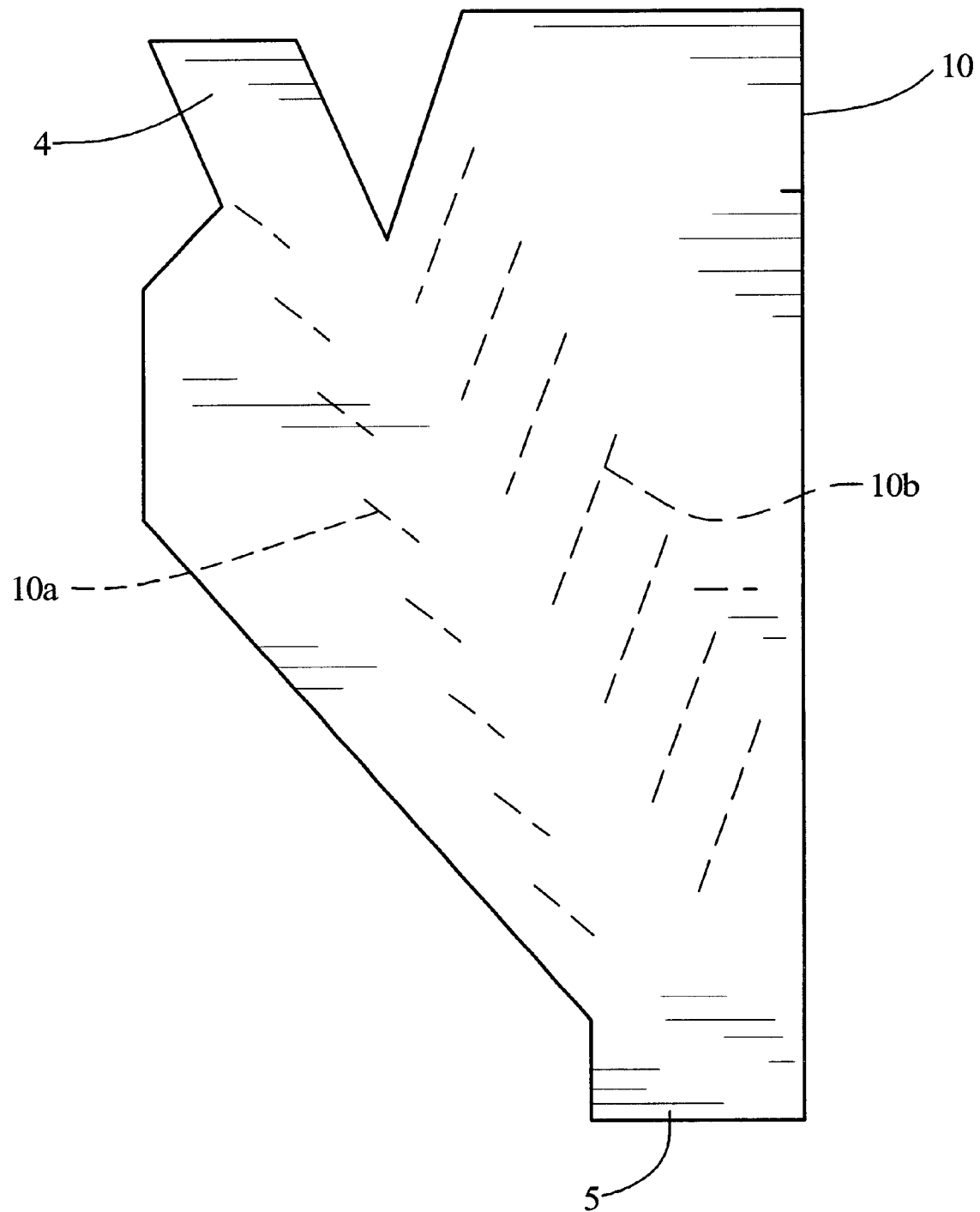
FIG. 2 is one embodiment of a step drier.

The raw meal slurry that is produced in the wet crushing plant (not shown) is transported from a silo 1 via a transport device 2 to a mechanical dewatering device 3, for example chamber filter press, in which a dewatering is carried out up to a material moisture of approximately 20%. The received filter cake, by means of another transport device 2', is then transported to a crushing device 19, for example a hasp, which is arranged above the moist material-admission opening 4 of a step drier 10, is crushed into lumps there and is then fed into the step drier 10. A drying ensues in this static cascade-step drier 10, given simultaneous disintegration and separation of the coarse filter cake pieces, with respect to a product with raw meal fineness and a residual moisture of approximately 0.5 through 1.0%.

The static cascade-step drier 10 has two separating and drying zone limiting walls 10a and 10b, which walls are surrounded by a shaft-shaped housing and which walls form a separating and drying zone between them. The walls are traversed by hot gas, as described below, from a cyclone suspension type heat exchange system in a cross current. The walls 10a, 10b have baffles that are transversely downwardly slanted in the direction of a discharge opening 5 for separated coarse material. The baffles are arranged in a cascade-like manner. The two baffle walls 10a, 10b, and therefore the separating and drying zone lying therebetween, are obliquely arranged at an angle deviating from a vertical line, as shown. This material, which is suitable for the further processing as cement raw meal, leaves the step drier 10 via an exhaust conduit 9 together with the hot gas and the vapors formed during the drying; is separated from the hot gas and the vapors in a cyclone pre-separator 16 that follows the step drier 10 and arrives as raw meal via the fine material discharge 17 of the cyclone pre-separator 16 and via a raw meal conveying device 12, for example a conveyor belt, at the cyclone suspension type heat exchanger system 13, which precedes the rotary tubular furnace 15 at the side of the material flow. The hot gas that is separated from the raw meal and the formed vapors exit at the gas exit opening 18 of the cyclone pre-separator 16 and are supplied for a dedusting (not shown) with the aid of a fan 11.

The filter cake pieces, which have not been completely disintegrated in the step drier 10 and which are possibly still moist as a result thereof, reach, by means of gravity, the lower discharge opening 5, which is provided with a lock, and are transported back into the step drier 10 in a closed circulation after they have exited, via appropriate conveying means, such as a coarse material conveyor belt 6, a bucket chain conveyor 7 and another coarse material conveyor belt 8, via the crushing device 19, from the step drier 10 in a manner that is gas proof with the aid of the lock.

The hot gas required for the drying is tapped from the cyclone heat exchangers 13 via a hot gas conduit 14 and is laterally—approximately in a cross current—transported into the step drier 10 and, being loaded with vapors and the completely disintegrated and dried raw meal, subsequently leaves it with the aid of the fan 11 via the exhaust conduit 9 (as explained above).

The invention is not limited to the shown exemplary embodiment, but can be inventively varied corresponding to the present material properties (for example moisture and the corn size) and can be varied corresponding to the present local conditions regarding the selection of the apparatus components, when a step drier is utilized for purposes of thermally drying the cement raw meal.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A system for producing cement clinker from a wet slurry raw material comprising:
    a dewatering mechanism for desiccating the wet slurry raw material to form a dewatered raw material;
    a step drier for thermally drying the dewatered raw material, the step drier including two separating and drying zone limiting walls surrounded by a housing and forming a separating and drying zone between the two separating and drying zone limiting walls, the two separating and drying zone limiting walls having baffles that are transversely downwardly slanted in a direction of a discharge opening for separated coarse material, the baffles being arranged in a cascade-like manner, whereby the baffles and the separating and drying zone formed between the baffles are obliquely arranged at an angle deviating from a vertical line; and
    a cyclone heat exchanger having a hot gas conduit for transporting hot gas from the cyclone heat exchanger to the step drier wherein the two separating and drying zone limiting walls are traversed by the hot gas received from the cyclone heat exchanger in a cross current.

2. The system according to claim 1 further wherein the step drier further includes an exhaust conduit for releasing a sufficiently dry raw material.

3. The system according to claim 2 wherein the sufficiently dry raw material has a residual moisture between approximately 0.5% and 1%.

4. The system according to claim 2 further including a cylone pre-separator connected to the step drier via the exhaust conduit.

5. The system according to claim 4 wherein the cyclone pre-separator has a fine material discharge connected via a raw material transporting device to the cyclone heat exchanger.

6. The system according to claim 4 wherein the cyclone pre-separator has a gas exit opening connected via a fan to a dedusting apparatus.

7. The system according to claim 1 wherein the dewatered raw material has a material moisture of approximately 20% or less.

8. The system according to claim 1 wherein the hot gas has a temperature between approximately 340° C. and 550° C.

9. The system according to claim 1 further including a crushing device arranged above a moist material opening in a top portion of the step drier.

10. The system according to claim 9 wherein a coarse raw material that is still moist is discharged through the discharge opening in the step drier and is supplied back to the crusher.

11. The system according to claim 10 wherein the lower discharge includes a lock.

12. The system according to claim 1 wherein a coarse raw material that is still moist is discharged through the discharge opening in the step drier and is supplied back to a moist material opening in a top portion of the step drier.

13. The system according to claim 12 wherein the lower discharge opening includes a lock.

14. A system for producing cement clinker from a wet slurry raw material comprising:
- a dewatering mechanism for desiccating the wet slurry raw material to form a dewatered raw material;
- a step drier for thermally drying the dewatered raw material, the step drier including:
  - two separating and drying zone limiting walls surrounded by a housing and forming a separating and drying zone between the two separating and drying zone limiting walls, the two separating and drying zone limiting walls having baffles that are transversely downwardly slanted in a direction of a discharge opening for separated coarse material, the baffles being arranged in a cascade-like manner, whereby the baffles and the separating and drying zone formed between the baffles are obliquely arranged at an angle deviating from a vertical line;
  - a moist material opening located in a top portion of the step drier; and
  - an exhaust conduit for releasing a sufficiently dry raw material along with hot gasses and vapors;
- a crushing device arranged above the moist material opening;
- a rotary tubular furnace including a cyclone heat exchanger system for receiving hot exhaust gasses from the rotary tubular furnace and having a hot gas conduit for transporting hot gas from the cyclone heat exchanger to the step drier wherein the two separating and drying zone limiting walls are traversed by the hot gas received from the cyclone heat exchanger in a cross current; and
- a cyclone pre-separator for separating the sufficiently dry raw material from the hot gasses and vapors, the cyclone pre-separator being connected to the step drier via the exhaust conduit and having a fine material discharge connected via a raw material transporting device to the cyclone heat exchanger.

15. The system according to claim 14 wherein a coarse raw material that is still moist is discharged through the discharge opening in the step drier and is supplied back to the crusher.

16. The system according to claim 15 wherein the lower discharge includes a lock.

17. The system according to claim 14 wherein a coarse raw material that is still moist is discharged through the discharge opening in the step drier and is supplied back to a moist material opening in a top portion of the step drier.

18. The system according to claim 17 wherein the lower discharge opening includes a lock.

19. A system for producing cement clinker from a wet slurry raw material comprising:
- a dewatering mechanism for desiccating the wet slurry raw material to form a dewatered raw material;
- a step drier for thermally drying the dewatered raw material, the step drier including two separating and drying zone limiting walls surrounded by a housing and forming a separating and drying zone between the two separating and drying zone limiting walls, the two separating and drying zone limiting walls having baffles that are transversely downwardly slanted in a direction of a discharge opening for separated coarse material, the baffles being arranged in a cascade-like manner, whereby the baffles and the separating and drying zone formed between the baffles are obliquely arranged at an angle deviating from a vertical line; the step drier further including an exhaust conduit for releasing a sufficiently dry raw material along with hot gas and vapors formed during drying;
- a cyclone heat exchanger having a hot gas conduit for transporting hot gas from the cyclone heat exchanger to the step drier wherein the two separating and drying zone limiting walls are traversed by the hot gas received from the cyclone heat exchanger in a cross current; and
- a cylone pre-separator to separate the sufficiently dry raw material from the hot gas and vapors, the cyclone pre-separator connected to the step drier via the exhaust conduit and having a gas exit opening connected to a fan for supplying the hot gas and vapors for dedusting.

* * * * *